May 1, 1934.  J. A. MACREADY  1,957,280
REFRIGERATING APPARATUS
Filed April 30, 1929  3 Sheets-Sheet 2

Inventor
John A. Macready
By Spencer, Hardman & Fehr
Attorney

Patented May 1, 1934

1,957,280

UNITED STATES PATENT OFFICE 1,957,280

REFRIGERATING APPARATUS

John A. Macready, Dayton, Ohio, assignor to Frigidaire Corporation, Dayton, Ohio, a corporation of Delaware Application April 30, 1929, Serial No. 359,357

4 Claims. (Cl. 62—89.5)

This invention relates to refrigerating apparatus and especially to a show case having an insulated display and storage chamber.

An object of the invention is to provide an insulated display chamber in which samples of the goods for sale may be placed for the observation of the customer.

Another object of the invention is to provide a storage space in the lower compartment of the refrigerator in which the goods actually sold may be stored.

Another object of the invention is to provide efficient storing and display chambers in the type of refrigerator commonly referred to as a show case refrigerator and in which different ranges of temperature below the freezing point of water are required.

Further objects and advantages of the present invention will be apparent from the following description, reference being had to the accompanying drawings, wherein a preferred form of the present invention is clearly shown.

Figure 1:
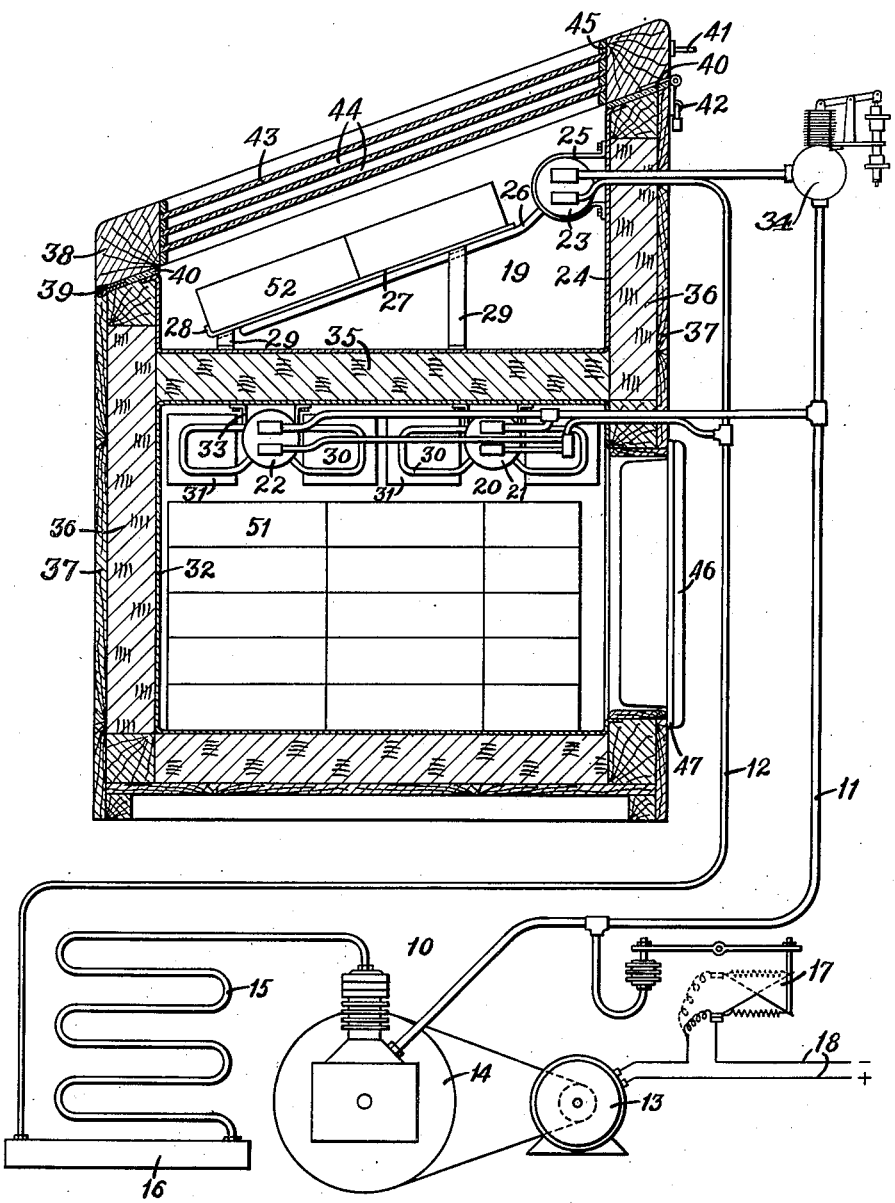
Fig. 1 illustrates a cross section of a refrigerator cabinet constructed according to the invention in connection with a refrigerant condensing unit diagrammatically illustrated.
Figure 2:
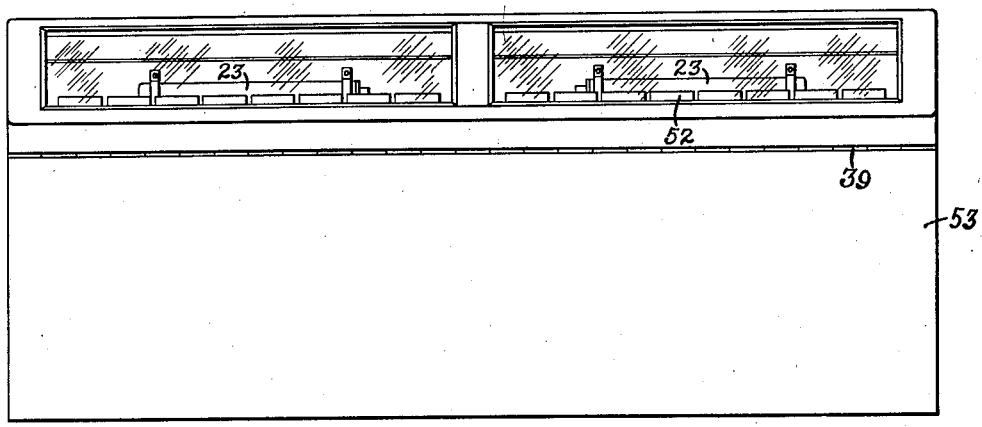
Fig. 2 is a front view of the refrigerator cabinet of Fig. 1.
Figure 3:
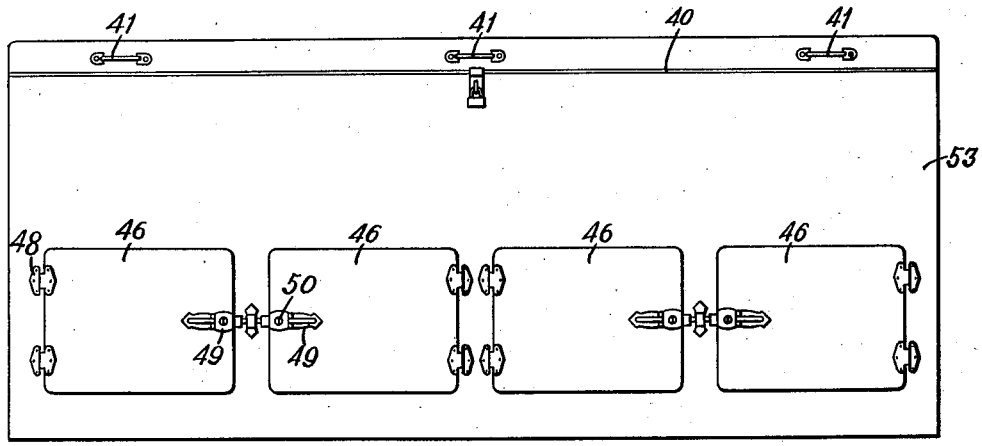
Fig. 3 is a rear view of a cabinet of Fig. 1.

With the advance in the production of intense cold by refrigeration there has been developed a considerable business that involves freezing food such as fish, poultry, fruit and other meat or produce to an intense cold and shipping this frozen means in packages to the retailer. It has been found that while a slow freezing of food would tend to break down the cell structure of the meat that if the meat or produce is frozen very quickly to a temperature of about −45° F. that the cell structure is not injured and when the meat or produce is thawed it is in the same if not better, condition than before it was frozen. While there may be adequate transportation facilities for keeping this frozen meat in a suitable condition, yet the problem remains of providing an adequate refrigerator for the storage of such meat by the retailer before its sale. Accordingly this invention contemplates a refrigerator cabinet space adapted for dispensing such frozen meats and produce. The invention further contemplates a shallow display chamber or compartment in the refrigerator in which chamber all the meat or produce to be sold may be displayed to the customer in addition to an adequate storage space for the goods that are actually sold to the customer. Such a cabinet is illustrated in cross section in Fig. 1 connected to a diagrammatically illustrated refrigerant condensing unit generally referred to by the numeral 10. This condensing unit withdraws the gaseous refrigerant from the vapor conduit 11 and liquefies the refrigerant and delivers it to a liquid supply conduit 12. The condensing element may be of any desired type for example it may include the usual motor 13, compressor 14, condenser 15, and receiver 16. The motor is actuated in response to the pressure within the conduit 11 by means of an automatic switch 17 which connects the motor to the power mains 18.

The liquid supply conduit extends through and into the upper display compartment 19 and the lower compartment 20 of the refrigerator cabinet. In these compartments it is connected with a plurality of evaporators some of which are indicated at 21, 22, 23 and 24. These evaporators are preferably of the flooded type and include a reservoir for liquid refrigerant which is kept at a constant level therein by means of a float control such as is described in the patent to Osborn, 1,556,708 issued October 13, 1925. The evaporators in the upper compartment designated as 23 and 24 may be fastened to the inner lining 24 by straps 25. A plurality of liquid refrigerant conduit tubes 26 preferably extend from these evaporators in a sloping direction and have attached in good thermal contact therewith a large fin 27. This fin has a flange 28 at its lower end and acts as a shelf in this display compartment. If desired, supports 29 of any convenient form may be used to support this fin. The lower compartment evaporators 21 and 22 preferably have the tubes 30 extending in a horizontal position from the evaporators and have attached to these loops the fins 31. The evaporators, their loops and fins are preferably supported from the inner lining 32 by the straps 33 and hang from the top of the chamber. Any number of evaporators may be used in either chamber. It is desired, however, to maintain the lower chamber preferably at a temperature from 10 to 15° F. and the display chamber at a temperature from 20 to 28° F. To produce this difference of temperature in the two compartments a two-temperature valve 34 is inserted in the suction line from the evaporators of the upper compartment. This two-temperature valve is preferably of the construction disclosed in the application of Gilbert H. Williams S/N 351,363 filed March 30, 1929. The structure of this valve is described as follows:

A valve casing 130 having an inlet 131 and an outlet 132 is connected in the suction conduit. Within the casing is a removable valve seat 127 and a valve proper 125 which is either raised to permit unrestricted communication between the inlet and outlet, or else is lowered against the seat to positively close the outlet, by means about to be described. The casing 130 is provided with a boss 134 to which is sealed the open end of a flexible metal bellows 135, the other end of which is closed in any suitable manner. Preferably the bellows is closed at its upper end by a cap 136 soldered to the bellows and its lower end is soldered to an end cap 137 secured to the boss 134 in any suitable manner, the boss having an opening 138 to provide communication between the bellows and the casing 130. Under contraction of the bellows is prevented by a stop formed by a rigid tube 139 secured to the lower end cap 137 against which the upper end cap rests when the bellows is contracted. Undue expansion of the bellows is prevented by a cage including a stop member 140 adapted to limit upward movement of the cap 136, and arms 141 which cooperate with members 142 and screws 143 to clamp the cage to the cap 137. The bellows forms a motor for operating the valve 125 in response to the pressure within the casing 130.

A link 145 consisting of a pair of spaced cheeks 146 and 147 is pivoted to a stationary pin 148 supported by the side walls of the casing 130. The valve stem 125 has a flattened portion 149 which is inserted between the cheeks 146 and 147 of the link 145 and is pivoted thereto by a pivot pin 150. A second stationary pin 151 is supported by the side walls of the casing and passes through an arcuate slot 152 near the other end of the link 145. The link may be rotated about the pivot 148 between two positions defined by the ends of the slot 152 and pin 151. A U-shaped member 153 consisting of a pair of spaced cheeks 154 joined by a bridge member 155 forms a second link, pivoted to the pin 151, the cheeks 154 and 155 lying outside of the link 145. The link 153 is connected to the free end of the link 145 by means of a spring guide 160, which is pivoted at 161 to the link 145 and passes through bridge member 155, and a compression spring 163 placed around the spring guide between the bridge 155 and the link 145. The link 153 extends beyond the pivot 150 and is connected at its free end by means of pivots 170 to the bifurcated end of a bar 171 which extends into the bellows 135 and is pivoted at 172 to the upper end cap 136.

Figure 4:
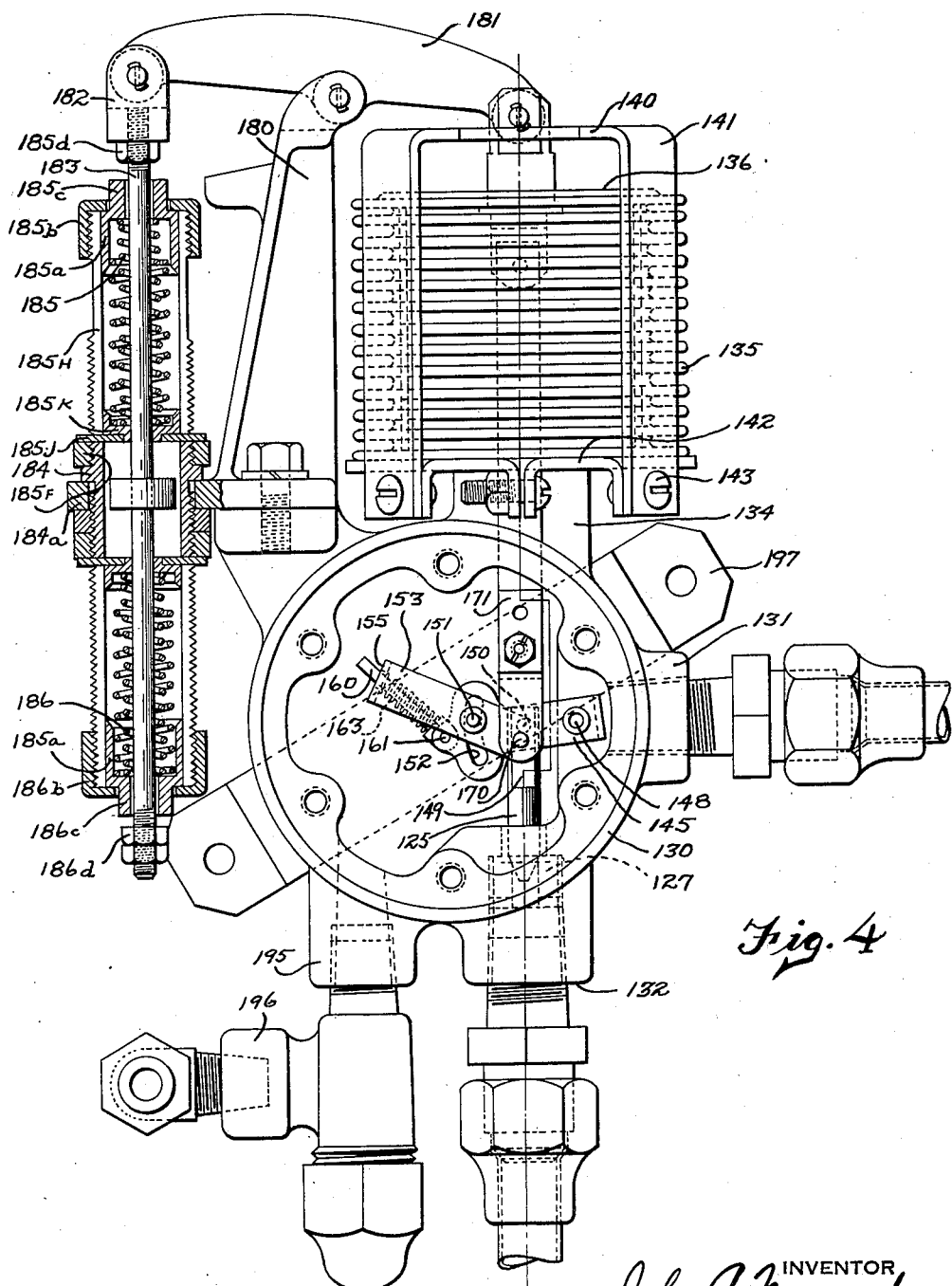
Fig. 4 is a sectional view of the valve shown in Fig. 1.

The apparatus above described constitutes a snap acting mechanism for operating the valve 125 in response to the pressure within the casing 130. Fig. 4 shows the positions of the parts when the pressure is low and the valve has closed. When the pressure is low the bellows is contracted against the stop 139 and holds the rod 171 against further downward movement. In this position the valve 125 is positively closed by the pressure of the spring 163 between the link 145 and the link 153, held stationary by the rod 171. As the pressure increases the bellows expands and moves the rod 171 upward. This rotates the link 153 counterclockwise about the pivot 151 further compressing the spring 163 between the bridge member 155 and the link 145. This compression of the spring urges the link 145 downwardly and thus holds the valve 125 seated until the bellows rotates the link 153 so that the spring guide 160, pivot 161 and pivot 170 are in alignment. At this point the spring is under maximum compression and any further expansion of the bellows, however slight, carries the spring guide out of alignment with the pivots 161 and 170. This permits the spring to expand and throw the link 145 abruptly upward until stopped by the pin 151 in the lower end of the slot 152. This abruptly opens the valve 125. The valve being open the pressure is high but as the pressure is reduced by the compressor 115 the bellows contracts to move the rod 171 downward. At a predetermined low pressure the bellows carries the spring through its point of maximum compression in the opposite direction and snaps the valve closed. The valve is held positively closed by the tension of the spring 163 acting as before explained.

In order to adjust the pressure valve at which the valve operates I provide adjustable means for resisting the movement of the bellows in each direction. Referring to Fig. 4 the casing 130 carries a support 180 to which is pivoted a lever 181, one end of which is pivoted to the bellows cap 136 and the other end of which carries a link 182 which supports a rod 183. A spring barrel 184 is secured to an extension 184a the support 180 and the rod 183 passes through the spring barrel. Springs 185 and 186 under compression act upwardly and downwardly respectively with respect to the support 184a on plungers 185a and 186a respectively. The springs are confined to the barrel by means of screw caps 185b and 186b respectively which enclose the plungers but permit reduced portions 185c and 186c of the plungers to protrude beyond the caps. The rod 183 passes through the plungers and springs and is provided adjacent each reduced portion of the plungers 186c and 185c with nuts 185d and 186d respectively.

Upon a predetermined expansion of the bellows the nut 185d contacts with the portion 185c of the plunger 185a and the spring 185 resists any further movement of the bellows. The tension of the spring determines the value of the resistance which is offered to the movement of the bellows, that is it determines the value of pressure at which the bellows expands sufficiently to open the valve. The tension of the spring is determined by the position of a nut 185f threaded on the outside of the spring barrel 184. The nut supports a spring abutment 185g which protrudes through slots 185h in the spring barrel and carries a spring cup 185k which in turn supports the spring 185. The spring may be any desired form of compression spring, but preferably a compound spring composed of two separate springs wound in opposite directions to prevent enmeshing of the convolutions, all as more fully disclosed in the application of Jesse G. King, Serial No. 124,160, filed July 22, 1926. The spring 186 and its adjusting mechanism are in all respects the counterparts of the spring 185 and its adjusting mechanism just described, except that the spring 186 opposes closing of the valve and thus determines the pressure in the valve casing 130 at which the valve is closed. It will be observed that the means for adjusting the valve opening pressure is independent of the means for adjusting the valve closing pressure, since when the bellows is moving in one direction the means for resisting its movement in the other direction is inoperative.

The valve casing 130 is closed and hermetically sealed by a cover.

This valve casing also has a boss 195 forming a connection for a valve or fitting 196 which permits the ready attachment of a gauge if desired. A bracket 197 is attached to the back of the casing 130 and provides means for supporting the entire valve mechanism. The two chambers are insulated from one another by means of the insulation 35, such as rock cork. These chambers are also insulated from the outside by other insulation 36 located in the framework of the cabinet generally referred to by the numeral 37. The display case has a lid on its upper portion constructed of a framework 38 hinged at the front of the cabinet by the hinges 39. Suitable insulation 40 prevents any heat leakage through the hinged joint. This insulation also extends around the other sides of the top of the cabinet. Suitable handling means 41 is provided at the rear of the cabinet for lifting the lid when desired. Locking means 42 is also provided to prevent any unauthorized lifting of the lid. Across the face of the lid is a plurality of transparent glass panels 43 inclosing one or more dead air spaces 44. Suitable insulation means 45 separate and support these glass panels. On the rear of the cabinet a plurality of doors 46 are provided for entrance to the lower storage chamber 20 and these doors have sealing means 47 around their edge for contact with the framework 37 of the cabinet. These doors have the usual hinging means 48 and latching means 49. These latching means have a locking means therein indicated by the key-hole 50 by which the door may be locked in its latched position. In the lower storage cabinet 20 is a large space which may be filled with packages 51 to be sold to the customer. A sample 52 of these packages may be placed in the upper display section 19 and remain there at long intervals of time. The samples 52 preferably have a transparent covering or the cover is broken away so that the customer may see the contents through the glass panels 43. By examining the various products displayed in the display case he may make his selection and upon giving his order to the clerk the clerk will withdraw a similar package from the storage chamber 20 in the bottom of the refrigerator. In this way the food displayed may be kept a long time in the upper display cabinet without being disturbed or handled until the store keeper desires a change in the display. The goods 51 that are actually sold are maintained at a suitable temperature and are not handled by the customer until the sale is made. Furthermore the goods 51 can be kept in their insulation wrapper as there is no need for displaying them due to the similar packages 52 in the upper display chamber. It is, of course, desirable to have the exterior 53 of the cabinet of a very presentable finish such as steel coated with porcelain or with pyroxaline paint.

It is to be noted that the packages on display, are generally box-like in character and that by my construction I have provided a quiescent, slab-like, cooling zone between the cover and the evaporator 27. This zone is of such a character that the display compartment has been reduced to very small proportions and utilizes a relatively small percent of the total cabinet space. The refrigeration of the display packages is accomplished more by direct contact with the evaporator 27 than by air circulation.

Various changes may be made in the preferred embodiment of the invention disclosed. For the sake of clearness the conduits 11 and 12 and valve 34 have been disposed outside of the cabinet. In normal construction, however, a large part of these conduits and the valve 34 may be placed at suitable places within the refrigerator cabinet. Various modifications may be made in the form of the evaporators and the tubes and fins connected thereto. It will be noted, however, that the fin 27 resting on the loop 26 provides a very efficient thermal conducting means between the display samples 52 and the refrigerant in the tubes 26 and evaporator 23. If desired an expansion system instead of the flooded system may be used in either or both chambers. Doors may be added to the display chamber.

Accordingly there has been disclosed a refrigerator adapted for the display and storage of food that is to be kept at a low temperature before sale. Furthermore arrangement of the cabinet provides a minimum of handling of the package goods before the sale.

While the form of embodiment of the invention as herein disclosed, constitutes a preferred form, it is to be understood that other forms might be adopted, all coming within the scope of the claims which follow.

What is claimed is as follows:

1. Apparatus for refrigerating frozen food articles to be vended comprising a refrigerator cabinet providing a display compartment and a storage compartment, a sloping transparent lid forming one wall of said display compartment, an evaporator in said display compartment and sloping in the direction of said lid, a fin in thermal contact with said evaporator and providing a display shelf, an evaporator in said storage compartment, a refrigerant condensing unit connected to said evaporators, and a two-temperature valve connected between said unit and one of said evaporators for maintaining a different range of temperature in each compartment, said ranges of temperature being below the thawing point of said articles.

2. Apparatus for refrigerating frozen food articles to be vended comprising a refrigerator cabinet providing a display compartment and a storage compartment, a sloping transparent lid forming one wall of said display compartment and the top of said cabinet, an evaporator in said display compartment and sloping in the direction of said lid, a flanged fin in thermal contact with said evaporator and providing a display shelf, an evaporator in said storage compartment, a refrigerant condensing unit connected to said evaporators, and a two-temperature valve connected between said unit and one of said evaporators for maintaining a different range of temperature in each compartment, said ranges of temperature being below the freezing point of water.

3. Apparatus for refrigerating frozen food articles to be vended comprising a refrigerator cabinet providing a display compartment and a storage compartment, a hinged sloping transparent lid forming one wall of said display compartment and the top of said cabinet, one or more doors for said storage compartment on the rear of said compartment, an evaporator in said display compartment and sloping in the direction of said lid, a flanged fin in thermal contact with said evaporator and providing a display shelf, an evaporator in said storage compartment, a refrigerant condensing unit connected to said evaporators, and a two-temperature valve connected between said unit and one of said evaporators for maintaining a different range of temperature in each compartment, said ranges of temperature being below the freezing point of water.

4. A refrigerator for articles to be vended including an insulated cabinet having a display compartment and a storage compartment insulated from the display compartment, said display compartment having an insulated transparent wall so that the articles within the display compartment may be viewed through the transparent wall, a refrigerant heat absorbing unit within the display compartment, said unit having a generally flat upper metallic shelf-like surface adjacent the insulated transparent wall for supporting the articles to be displayed so that they may be viewed through the transparent wall, said articles to be displayed being in direct heat transfer relation with the heat absorbing unit to maintain the articles at a proper preserving temperature, a second heat absorbing unit within the insulated storage compartment for maintaining articles stored in the storage compartment at the proper temperature, a refrigerant condensing unit connected to the heat absorbing units, and a two temperature valve connected between the condensing unit and one of the heat absorbing units for maintaining a different range of temperature in each compartment.

JOHN A. MACREADY.